United States Patent
Aggarwal et al.

(10) Patent No.: US 7,739,284 B2
(45) Date of Patent: Jun. 15, 2010

(54) METHOD AND APPARATUS FOR PROCESSING DATA STREAMS

(75) Inventors: Charu C. Aggarwal, Mohegan Lake, NY (US); Philip Shi-Lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 11/110,079

(22) Filed: Apr. 20, 2005

(65) Prior Publication Data

US 2006/0282425 A1 Dec. 14, 2006

(51) Int. Cl.
*G06F 7/00* (2006.01)
(52) U.S. Cl. .................. 707/737; 707/803; 707/809
(58) Field of Classification Search ............. 707/104.1, 707/202, 201, 204, 737, 803, 809
See application file for complete search history.

(56) References Cited

U.S. PATENT DOCUMENTS

| | | | | |
|---|---|---|---|---|
| 6,092,072 A * | 7/2000 | Guha et al. | ............... | 707/101 |
| 6,272,250 B1 * | 8/2001 | Sun et al. | ............... | 382/225 |
| 6,470,344 B1 * | 10/2002 | Kothuri et al. | ............... | 707/100 |
| 6,728,730 B1 * | 4/2004 | Muro et al. | ............... | 707/104.1 |
| 6,944,607 B1 * | 9/2005 | Zhang et al. | ............... | 707/2 |
| 7,386,523 B2 * | 6/2008 | Diao | ............... | 706/25 |
| 2003/0177110 A1 * | 9/2003 | Okamoto et al. | ............... | 707/3 |
| 2005/0010555 A1 * | 1/2005 | Gallivan | ............... | 707/2 |
| 2005/0038769 A1 | 2/2005 | Aggarwal et al. | | |
| 2005/0080900 A1 * | 4/2005 | Culbertson et al. | ............... | 709/226 |

FOREIGN PATENT DOCUMENTS

CN 1581166 2/2005

OTHER PUBLICATIONS

Liadan O'Callaghan, Nina Mishra, Adam Mey Erson, Sudpipto Guha, Rajeev Motwani, Streaming-Data Algorithms For High-Quality Clustering, IEEE, 2002.*
Hoong Hyuk Chang, Won Suk Lee, Finding Recent Frequent Itemsets Adaptively over Online Data Streams, ACM, 2003.*
Daniel Barbara, Ping Chen, Using the Fractal Dimension to Cluster Datasets, ACM 2000 p. 260-264.*
Moses Charikar, Chandra Chekuri, Tomas Feder, and Fajeev Motwani, Incremental Clustering and Dynamic Infomration Retrieval; ACM 1997, p. 626-635.*
R. Aggarwal et al., "Automatic Subspace Clustering of High Dimensional Data for Data Mining Applications," ACM SIGMOD Conference, 12 pages, 1998.

(Continued)

*Primary Examiner*—Hosain T Alam
*Assistant Examiner*—Amy Ng
(74) *Attorney, Agent, or Firm*—Kenneth R. Corsello; Ryan, Mason & Lewis, LLP

(57) ABSTRACT

A technique for processing a data stream includes the following steps/operations. A cluster structure representing one or more clusters in the data stream is maintained. A set of projected dimensions is determined for each of the one or more clusters using data points in the cluster structure. Assignments are determined for incoming data points of the data stream to the one or more clusters using distances associated with each set of projected dimensions for each of the one or more clusters. Further, the cluster structure maybe used for classification of data in the data stream.

24 Claims, 5 Drawing Sheets

OTHER PUBLICATIONS

C.C. Aggarwal et al., "Fast Algorithms for Projected Clustering," ACM SIGMOD Conference, 12 pages, 1999.

C.C. Aggarwal et al., "A Framework for Clustering Evolving Data Streams," Proceedings of the 29th VLDB Conference, 12 pages, 2003.

C.C. Aggarwal et al., "A Framework for Projected Clustering of High Dimensional Data Streams," Proceedings of the 30th VLDB Conference, 12 pages, 2004.

* cited by examiner

METHOD AND APPARATUS FOR PROCESSING DATA STREAMS

This invention was made with Government support under Contract No.: H98230-04-3-0001 awarded by the U.S. Department of Defense. The Government has certain rights in this invention.

FIELD OF THE INVENTION

This present invention generally relates to data processing techniques and, more particularly, to techniques for clustering and classifying data streams such as high dimensional data streams.

BACKGROUND OF THE INVENTION

Techniques for processing data streams have gained importance in recent years because of the great ease with which stream data can be collected. That is, hardware technology advances have made it easy to automatically record data associated with transactions and activities in everyday life. By way of example only, such data may be collected in the context of retail sales applications, multimedia applications, telecommunication applications, etc. It is also known that such data often has a very high dimensionality associated therewith. Data sets which have inherently high dimensionality may include, by way of example only, demographic data sets in which the dimensions comprise information such as the name, age, salary, and numerous other features which characterize a person.

The ubiquitous presence of data streams in a number of practical domains (e.g., retail sales, multimedia, telecommunications, as mentioned by way of example above) has generated much research, particularly, in the areas of clustering and classification of stream data. The clustering problem is especially interesting for the data stream domain because of its application to data summarization and outlier detection. Examples of such research are disclosed in R. Agrawal et al., "Automatic Subspace Clustering of High Dimensional Data for Data Mining Applications," ACM SIGMOD Conference, 1998; C. C. Aggarwal et al, "Fast Algorithms for Projected Clustering," ACM SIGMOD Conference, 1999; C. C. Aggarwal et al., "A Framework for Clustering Evolving Data Streams," VLDB Conference, 2003; and C. C. Aggarwal et al., "A Framework for High Dimensional Projected Clustering of Data Streams," VLDB Conference, 2004, the disclosures of which are incorporated by reference herein.

SUMMARY OF THE INVENTION

The present invention provides techniques for clustering and classifying stream data. While not limited thereto, such techniques are particularly well-suited to stream data exhibiting high dimensionality.

By way of example, in one aspect of the invention, a technique for processing a data stream comprises the following steps/operations. A cluster structure representing one or more clusters in the data stream is maintained. A set of projected dimensions is determined for each of the one or more clusters using data points in the cluster structure. Assignments are determined for incoming data points of the data stream to the one or more clusters using distances associated with each set of projected dimensions for each of the one or more clusters.

In another aspect of the invention, the cluster structure may be used for classification of data in the data stream.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
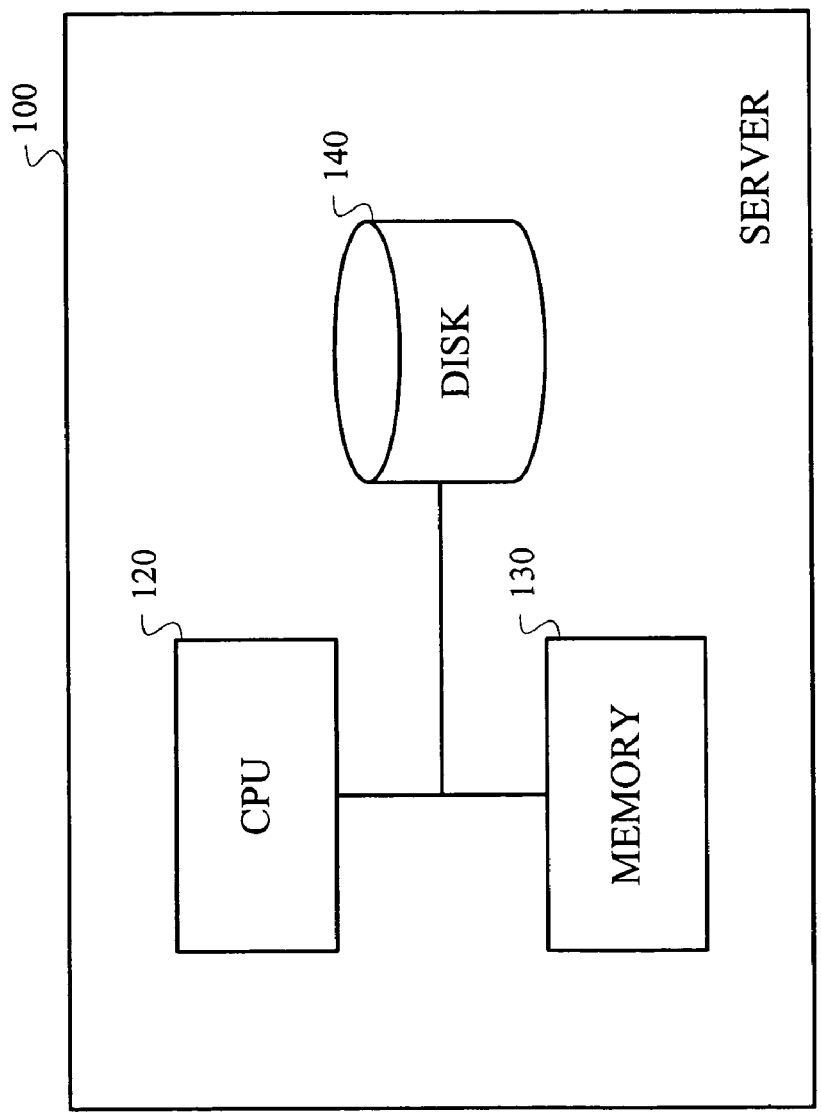
FIG. 1 illustrates a server architecture in accordance with which data stream processing may be employed, according to an embodiment of the present invention.

The following description will illustrate the invention using an exemplary data processing system architecture. It should be understood, however, that the invention is not limited to use with any particular system architecture. The invention is instead more generally applicable to any data processing system in which it is desirable to perform data stream clustering and classification.

While the invention is not limited thereto, the invention is particularly well-suited for high dimensional stream data sets. By way of example only, dimensionality of a stream may be considered "high" when there are 10 or more dimensions. However, there is no strict dimensionality threshold value that dictates stream data being considered as exhibiting a "high" dimensionality. Nonetheless, techniques of the invention are not limited to any particular quantitative dimensionality threshold.

Also, as used herein the phrase "data stream" may generally refer to a continuous sequence of data over a given time period. By way of example, such a sequence of data may be generated by a real-time process which uses continuous data storage. For example, even simple transactions of every day life such as using a credit card result in automated storage at the credit card company's database. For a major company, this could result in millions of transactions of data—a typical example of a high volume data stream.

As will be illustrated in detail below, the present invention provides techniques for constructing clusters across high dimensional data streams. Such techniques employ an iterative process for clustering the data objects in a subspace of the dimensions. The approach may further be employed to classify high dimensional stream data. In order to perform the classification, in one illustrative embodiment, the techniques of the invention construct clusters using alternate projections and clusterings over these projections. Accordingly, the invention provides techniques for high-dimensional, projected data stream clustering and classification.

The clustering problem is illustratively defined as follows: for a given set of data points (also referred to herein as "points"), we wish to partition the points into one or more groups of similar objects, where the notion of similarity is defined by a distance function. In the data stream domain, the clustering problem requires a process which can continuously determine the dominant clusters in the data without being dominated by the previous history of the stream.

The high-dimensional case presents a special challenge to clustering algorithms even in the traditional domain of static data sets. This is because of the sparsity of the data in the high-dimensional case. In high-dimensional space, all pairs of points tend to be almost equidistant from one another. As a result, it is often unrealistic to define distance-based clusters in a meaningful way.

It is known that techniques exist for projected clustering which can determine clusters for a specific subset of dimensions, see, e.g., C.C. Aggarwal et al, "Fast Algorithms for Projected Clustering," ACM SIGMOD Conference, 1999, the disclosure of which is incorporated by reference herein. In these methods, the definitions of the clusters are such that each cluster is specific to a particular group of dimensions. This alleviates the sparsity problem in high-dimensional space to some extent. Even though a cluster may not be meaningfully defined on all the dimensions because of the sparsity of the data, some subset of the dimensions can be found on which particular subsets of points form high quality and meaningful clusters. Of course, these subsets of dimensions may vary over the different clusters. Such clusters are referred to as projected clusters. For example, consider a set of data points in some multidimensional space. A projected cluster is a subset P of data points together with a subset D of dimensions such that the points in P are closely clustered in the subspace of dimensions D.

The concept of a projected cluster is formally defined as follows. Assume that k is the number of clusters to be found. The clustering algorithm will take as input the dimensionality l of the subspace in which each cluster is reported. The output of the algorithm contains the set of points in the cluster, as well as a cluster-specific set of dimensions.

In the context of a data stream, the problem of finding projected clusters becomes even more challenging. This is because the additional problem of finding the relevant set of dimensions for each cluster makes the problem significantly more computationally intensive in the data stream environment. While the problem of clustering has been studied in the data stream environment, these methods are for the case of full dimensional clustering. The invention addresses the significantly more difficult problem of clustering a high dimensional data stream in accordance with projected clustering.

As will be illustratively explained, the invention provides techniques for high-dimensional projected stream clustering that includes continuous refinement of the set of projected dimensions and data points during the progression of the stream. The updating of the set of dimensions associated with each cluster is performed in such a way that the points and dimensions (it is understood that a dimension is one component of a point, for example, a demographic database has a point for each individual, of which one dimension is his age) associated with each cluster can effectively evolve over time. In order to achieve this goal, a condensed representation of the statistics of the points inside the clusters is utilized. These condensed representations are chosen in such a way that they can be updated effectively in a fast data stream. At the same time, a sufficient amount of statistics is stored so that important measures about the cluster in a given projection can be quickly computed.

In addition, the invention addresses the problem of high dimensional data stream classification. It is to be noted that the high dimensional case presents a special challenge to classification problems because of the large number of combinations of attributes which can be used in the classification process. The clustering process of the invention can be used in order to improve the effectiveness of the classification process since we can use a nearest cluster classification process in conjunction with a high dimensional projected stream clustering method. This nearest cluster classification methodology can be used in order to construct an efficient high dimensional classifier for a variety of cases.

The data stream consists of a set of multi-dimensional records $X_1 \ldots X_k$ arriving at time stamps $T_1 \ldots T_k$. Each data point $X_i$ is a multi-dimensional record containing d dimensions, denoted by $X_i = (x_i^1 \ldots x_i^d)$. Since the stream clustering process should provide a greater level of importance to recent data points, we introduce the concept of a fading data structure which is able to adjust for the recency of the clusters in a flexible way. It is assumed that each data point has a weight defined by a function f(t) to the time t. The function f(t) is also referred to as the fading function. The value of the fading function lies in the range (0, 1). It is also assumed that the fading function is a monotonic decreasing function which decays uniformly with time t. In particular, we choose an exponential form for the fading function. In order to formalize this concept, we define the half-life of a point in the data stream as follows: the half life $t_0$ of a point is defined as the time at which $f(t_0) = (\frac{1}{2})f(0)$.

Conceptually, a goal of defining a half life is to define the rate of decay of the weight assigned to each data point in the stream. Correspondingly, the decay-rate is defined as the inverse of the half life of the data stream. We denote the decay rate by $\lambda = 1/t_0$. In order for the half-life property to hold, we define the weight of each point in the data stream by $f(t) = 2^{-\lambda \cdot t}$. From the perspective of the clustering process, the weight of each data point is f(t). It is evident that this decay function creates a half life of $1/\lambda$. It is also evident that by changing the value of $\lambda$, it is possible to change the rate at which the importance of the historical information in the data stream decays. The higher the value of $\lambda$, the lower the importance of the historical information compared to more recent data.

We will now define the fading cluster structure (FCS), a data structure which is designed to capture key statistical characteristics of the clusters generated during the course of a data stream. A goal of the fading cluster structure is to capture a sufficient number of the underlying statistics so that it is possible to compute key characteristics of the underlying clusters.

A fading cluster structure at time t for a set of d-dimensional points $C = \{X_{i1} \ldots X_{in}\}$ with time stamps $T_{i1} \ldots T_{in}$ is defined as the (2·d+1) tuple containing the following sets of entries:

(i) For each dimension j, the j-th entry is given by the weighted sum of the squares of the corresponding data values in that dimension. The weight of each data point is defined by its level of staleness since its arrival in the data stream. Thus, this entry contains d values. The j-th entry is equal to $\Sigma_{k=1}^{n} f(t-T_{i_k}) \cdot (x_{i_k}^j)^2$.

(ii) For each dimension j, the j-th entry is given by the weighted sum of the corresponding data values. The weight of each data point is defined by its level of staleness since its arrival in the data stream. Thus, this entry contains d values. The j-th entry is equal to $\Sigma_{k=1}^{n} f(t-T_{i_k}) \cdot (x_{i_k}^j)$.

(iii) We also maintain a single entry W(t) containing the sum of all the weights of the data points at time t. Thus, this entry is equal to $\Sigma_{k=1}^{n} f(t-T_{i_k})$.

The overall methodology for clustering, according to the invention, uses an iterative process which maintains the faded cluster structure in conjunction with constructing the points and dimensions for the different clusters. This process of constructing and maintaining the points and dimensions for the different clusters is described below. In addition, the methodology can be used for high dimensional classification. This is because the technique can be used to construct clusters which are specific to a given class. When new test examples are received, they are fitted into the nearest cluster and the corresponding class label is reported.

Referring initially to FIG. 1, a block diagram illustrates a hardware implementation suitable for employing clustering and classification methodologies according to an embodiment of the present invention. As illustrated, an exemplary system comprises a server 100. The server 100 may comprise a central processing unit (CPU) 120 coupled to a main memory 130 and a disk 140. While not expressly shown, it is assumed that multiple clients, from which data to be processed may be collected, can interact with the server 100 over a communication network. It is to be appreciated that the network may be a public information network such as, for example, the Internet or World Wide Web, however, the clients and server may alternatively be connected via a private network, a local area network, or some other suitable network. Also, it is to be understood that server 100 may receive data streams to be processed from any other source or sources.

The clustering and classification operations/computations of the invention are performed at the CPU 120 on the server 100. It is to be understood that the client devices may supply data sets to be processed to server 100. However, all or portions of the data sets to be processed may already be available at the server (e.g., on disk 140), or may be accessible by the server. The main memory 130 may be used in order to store some or all of the intermediate results performed during the operations/computations. Results of these operations/computations may be returned to a requesting client device and/or provided to some other destination.

In one preferred embodiment, software components including instructions or code for performing the methodologies of the invention, as described herein, may be stored in one or more memory devices described above with respect to the server and, when ready to be utilized, loaded in part or in whole and executed by the CPU.

Since the inventive methodology is designed for projected clustering of data streams, a set of dimensions is associated with each cluster. Therefore, with each cluster C, we associate a d-dimensional bit vector B(C) which corresponds to the relevant set of dimensions in C. Each element in this d-dimensional vector has a 1-0 value (each element can have either a "1" value or a "0" value) corresponding to whether or not a given dimension is included in that cluster. This bit vector is required for the book-keeping needed in the assignment of incoming points to the appropriate cluster. As the methodology progresses, this bit vector varies to reflect the changing set of dimensions.

The methodology for high-dimensional clustering utilizes an iterative approach which continuously determines new cluster structures while redefining the set of dimensions included in each cluster. The input to the clustering methodology includes the current cluster structure FCS and the sets of dimensions associated with each cluster. These cluster structures and sets of dimensions are dynamically updated as the methodology progresses. The set of dimensions BS associated with each cluster includes a d-dimensional bit vector $B(C_i)$ for each cluster structure in FCS. This bit vector contains a 1 bit for each dimension which is included in cluster $C_i$. In addition, the maximum number of clusters k and the average cluster dimensionality l are used as input parameters. The average cluster dimensionality l represents the average number of dimensions used in the cluster projection.

The iterative data stream clustering methodology of the invention assigns data points to the closest cluster structure at each step of the process. The closest cluster structure is determined by using a projected distance measure. For each cluster, only those dimensions which are relevant to that cluster are utilized in the distance computation. At the same time, the set of projected dimensions associated with each cluster continues to be redefined. The redefinition of the projected dimension attempts to keep the radii of the clusters over the projected dimensions as low as possible. Thus, the clustering process simultaneously maintains the clusters as well as the set of dimensions associated with each cluster.

Figure 2:
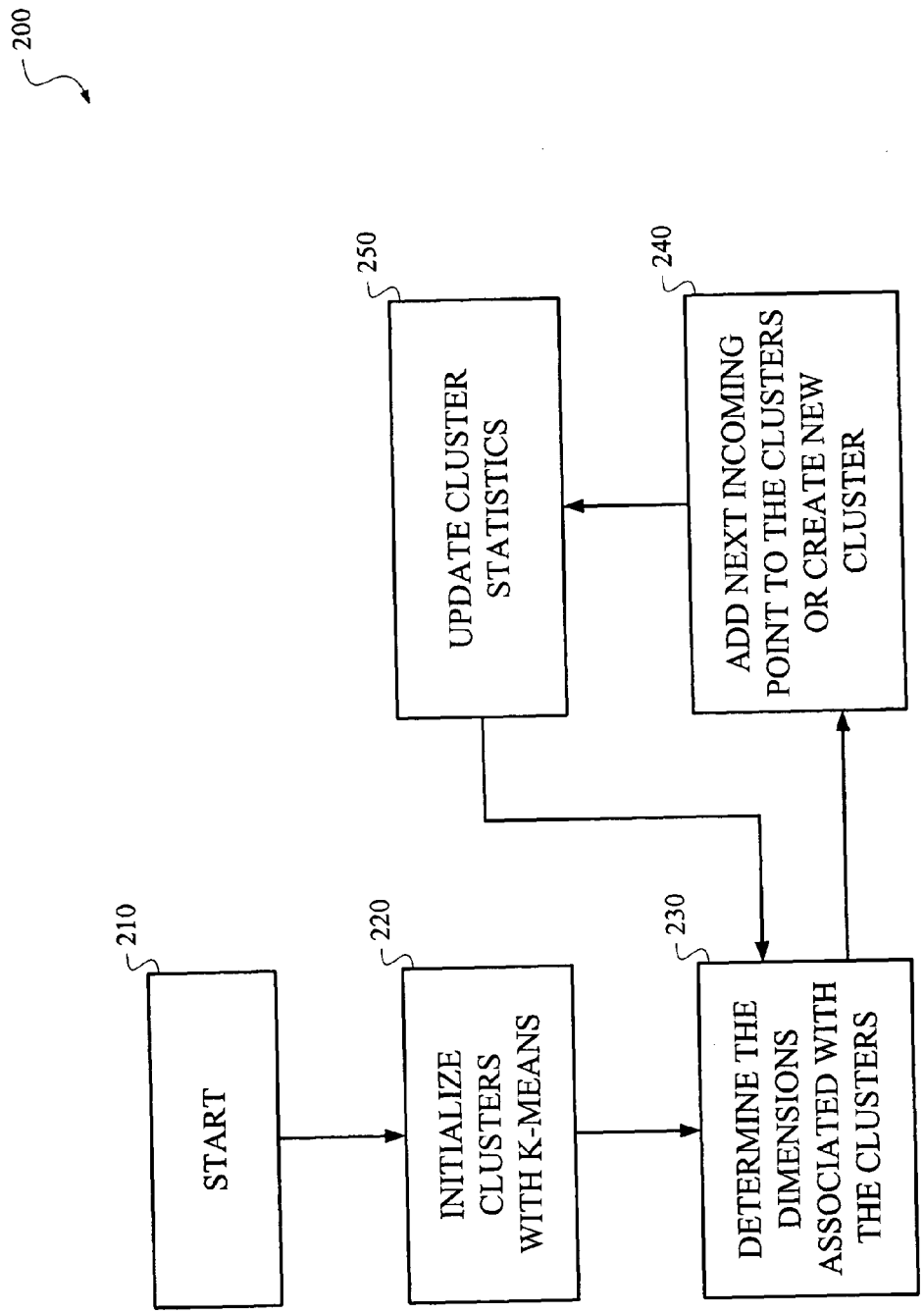
FIG. 2 illustrates a method for clustering of a high dimensional data stream, according to an embodiment of the present invention.

An overall clustering process 200 is illustrated in FIG. 2. The process begins at block 210. In step 220, the process initializes the set of clusters in the data. If desired, the well-known k-means approach can be used to construct the initial set of clusters. The well-known k-means approach is described in A. Jain et al., "Algorithms for Clustering Data," Prentice Hill, Englewood Cliffs, N.J., 1998, the disclosure of which is incorporated by reference herein.

In step 230, the process finds the set of dimensions associated with each of the set of clusters. Details about finding this set of dimensions will be described below.

In step 240, the process assigns the incoming point from the data stream to the nearest cluster, or creates a new cluster. Determination of the closest cluster structure to the incoming data point X may be accomplished as follows. The process computes the distance of X to each cluster centroid using only the set of projected dimensions for the corresponding cluster. The centroid of a cluster may be the algebraic average of all the points in the cluster. This data in BS is used as a book-keeping mechanism to determine the set of projected dimensions for each cluster during the distance computation. Once it is decided which cluster the data point X should be assigned to, the process determines the limiting radius of the corresponding cluster. The limiting radius is considered a boundary of the cluster. The radius of a cluster may be the average distance of a point from the centroid of the cluster. Data points which lie outside this boundary are not added to the cluster. Instead, such points create new clusters of their own. If the incoming data point lies inside the limiting radius, it is added to the cluster. Otherwise, a new cluster is constructed containing the solitary data point X.

In step 250, the process updates the cluster statistics to reflect the incoming point in the cluster. Then, the process returns to step 230 to process the next point in the data stream.

Next, construction of the projected dimensions is accomplished by calculating the spread along each dimension for each cluster in FCS. Thus, a total of |FCS|*d values are computed and ranked in increasing order. The |FCS|*l dimensions with the least radii are selected as the projected dimensions for that cluster. The incoming data point X is included in each cluster for the purpose of computation of dimensions. This ensures that if the incoming data point is added to that cluster, the corresponding set of projected dimensions reflect the included data point X. This helps in a more stable computation of the projected dimensionality when the cluster contains a small number of data points. The dimensions of the clusters are chosen in such a way that the spread along each dimension is as small as possible.

We note that many of the clusters may contain only a few points. This makes it difficult to compute the dimensions in a statistically robust way. In the extreme case, a cluster may contain only one point. In this degenerate case, the computation of the dimensions is not possible since the radii along different dimensions cannot be distinguished. In order to deal with such degenerate cases, we use the incoming data point X during the determination of the dimensions for each cluster. It is desirable to pick the dimensions in such a way that X fits the selected cluster well even after the projected dimensions are selected. Specifically, the data point X is temporarily added to each possible cluster during the process of determination of dimensions. This makes a significant difference to the chosen dimensions for clusters which contain very few data points. Once these selected dimensions have been chosen, the corresponding bits are stored in BS.

Figure 3:
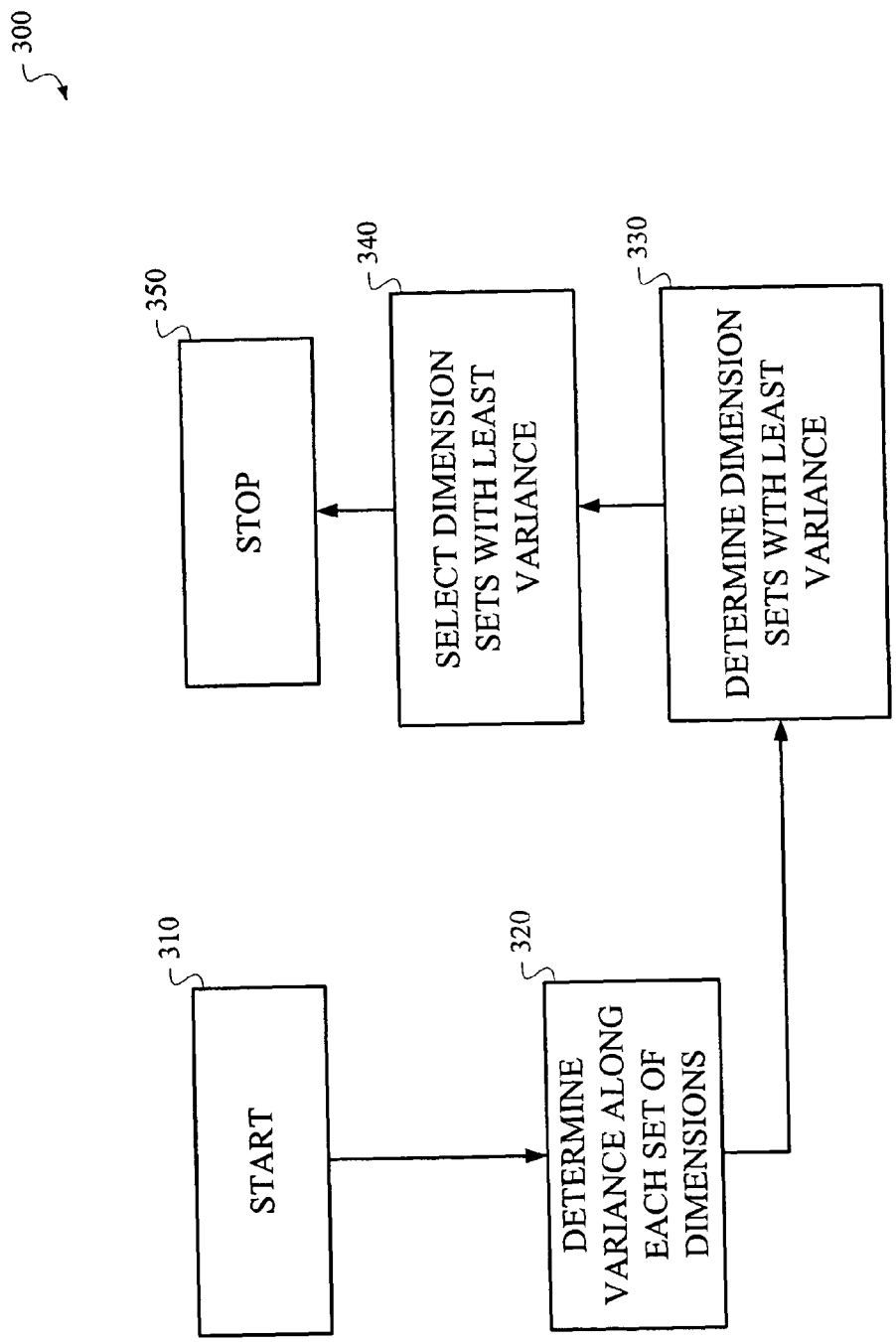
FIG. 3 illustrates a method for determining projections over different clusters, according to an embodiment of the present invention.

FIG. 3 illustrates process 300 for use in determining projections over the different clusters. The process begins at block 310. In step 320, the process determines the variance along the individual dimensions. In step 330, the process determines the dimension sets with the least variance. These dimension sets are selected and reported in step 340. The process ends at block 350.

In order to determine the closest cluster to the incoming data point, a procedure for determining the projected distance of X from each cluster $C_r$ may be used. In order to find the projected distance, the distance along each dimension with bit value of one in $B(C_r)$ is determined. The average distance along these dimensions (also known as the Manhattan Segmental Distance) is reported as the projected distance. This distance value is computed for each cluster, and the data point X is added to the cluster with the least distance value.

Recall that, in step 240 of FIG. 2, an incoming data point is added to a cluster, or a new cluster is created with a solitary data point. A motivation for finding the limiting radius is to determine the boundary of the clusters. Incoming data points which do not lie within this limiting radius of their closest cluster are assigned a cluster of their own. This is because these data points do not naturally fit inside any of the existing clusters. The limiting radius is defined as a certain factor of the average radius of the data points in the cluster. This radius can be computed using the statistics in the fading cluster structure.

Thus, any incoming data point which lies outside a factor $\tau$ of the average radius along the projected dimensions of its closest cluster necessitates creation of a new cluster containing a solitary data point. The process of finding the average radius along the projected dimensions is illustrated in FIG. 4.

Figure 4:
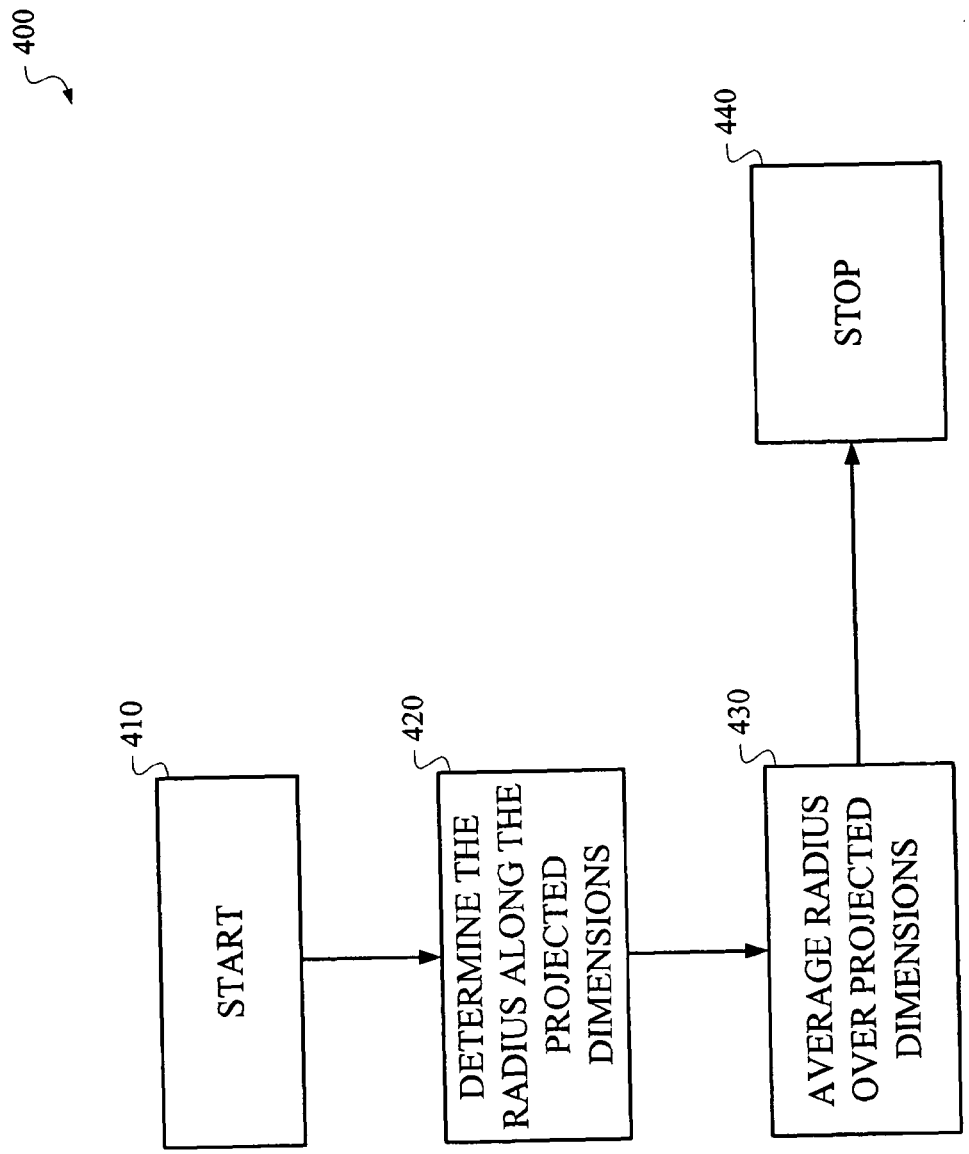
FIG. 4 illustrates a method for finding boundaries for a cluster, according to an embodiment of the present invention.

As shown in FIG. 4, process 400 begins at block 410. In step 420, the process determines the radius along the projected dimensions. In step 430, the average radius over the projected dimensions is then determined. The process ends at block 440.

As mentioned above, the clustering process of the invention can advantageously be used for high dimensional classification. In order to use the approach for high dimensional classification, clusters are created separately for each class in the data. Once such clusters have been created, the process illustrated in FIG. 5 can be used for the classification of an individual test instance.

Figure 5:
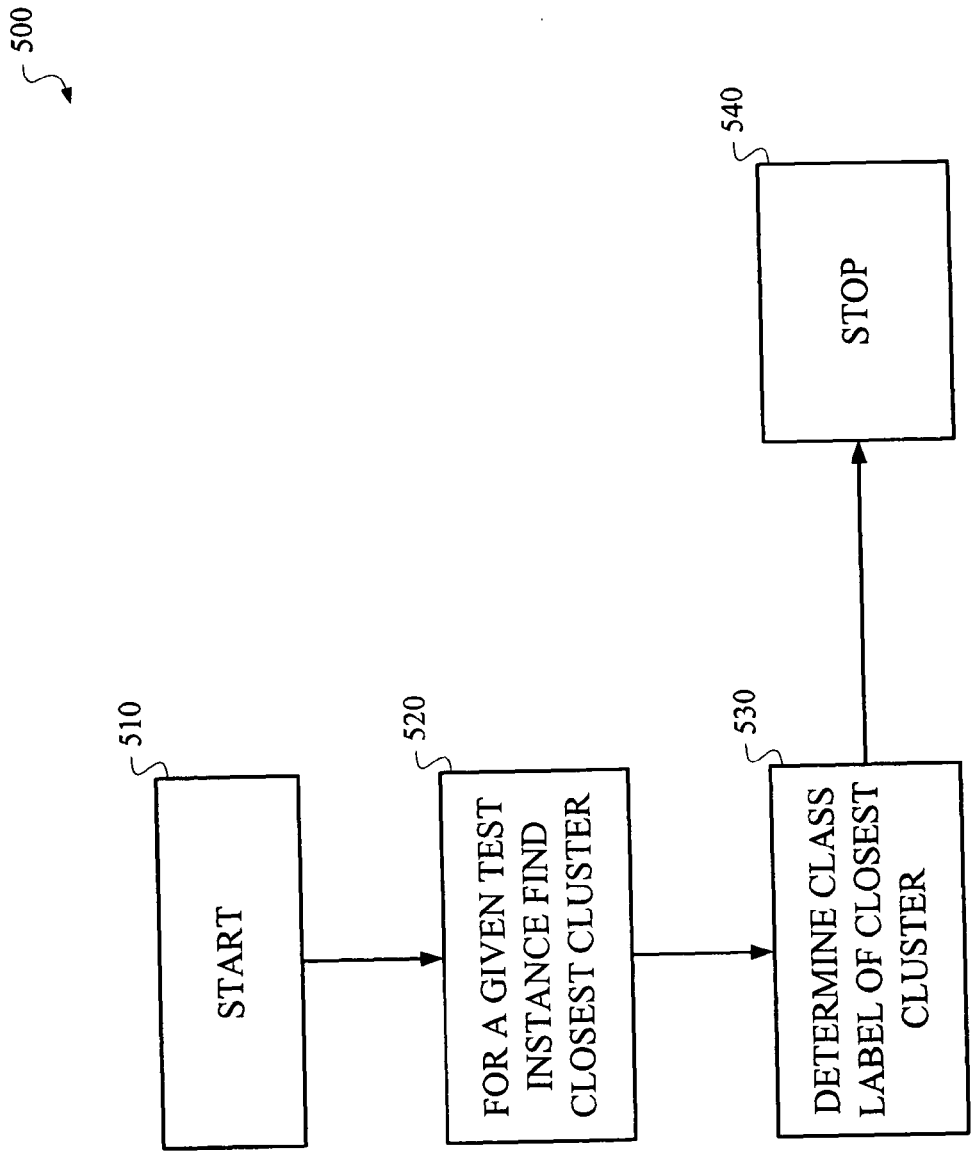
FIG. 5 illustrates a method for performing high dimensional data stream classification, according to an embodiment of the present invention.

As shown in FIG. 5, process 500 begins at block 500. In step 520, the process finds the closest cluster to the test instance along the projected set of dimensions. In step 530, the class label of the closest cluster is reported as the relevant class label for the test instance. The process stops at block 540.

Accordingly, as illustratively described herein, the invention provides a new framework for high-dimensional projected clustering of data streams. It finds projected clusters in particular subsets of the dimensions by maintaining condensed representations of the clusters over time. High-dimensional projected clustering of data streams opens a new direction for exploration of stream data mining. With this methodology, one can treat projected clustering as a step, which may be used to provide more effective methods for stream classification, similarity, evolution and outlier analysis. Advantageously, the invention provides a high dimensional projected stream clustering process in order to perform data mining.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of processing a continuously progressing data stream, comprising the steps of:

maintaining a cluster structure, the cluster structure representing one or more clusters in the continuously progressing data stream, wherein the cluster structure comprises one or more data points in a multidimensional space, further wherein the one or more data points of the cluster structure fade as the continuously progressing data stream progresses;

determining a set of projected dimensions for each of the one or more clusters using the one or more data points in the cluster structure, a given set of projected dimensions of a cluster being associated with a subset of a total number of dimensions of the continuously progressing data stream and the given set of projected dimensions being represented by a d-dimensional bit vector such that dimensions of the d dimensions in the bit vector that are present in the cluster are assigned one value and dimensions of the d dimensions in the bit vector that are not in the cluster are assigned another value, the given set of projected dimensions being continuously redefined to minimize a cluster radius, wherein redefining the set of projected dimensions comprises varying the values of the bit vector based on which dimensions are present and not present in the cluster as the data stream progresses and the one or more data points fade; and determining assignments for incoming data points of the continuously progressing data stream to the one or more clusters using distances associated with each set of projected dimensions for each of the one or more clusters;

wherein one or more of the steps of maintaining the cluster structure, determining the set of projected dimensions, and determining the assignments are implemented as one or more software components that are loaded from a memory and executed by a processor.

2. The method of claim 1, wherein the assignment determining step further comprises assigning an incoming data point to a closest cluster of the one or more clusters when the incoming data point lies inside a boundary of the closest cluster.

3. The method of claim 2, wherein the assigning step further comprises determining the boundary of a cluster using a radius of the cluster.

4. The method of claim 1, wherein the assignment determining step further comprises assigning an incoming data point to a newly created cluster when the incoming data point lies outside a boundary of a closest cluster.

5. The method of claim 1, wherein the assignment determining step further comprises assigning the incoming data point to a closest cluster using the corresponding set of projected dimensions.

6. The method of claim 1, wherein the assignment determining step further comprises determining a distance of the incoming data point to each cluster using the corresponding set of dimensions for each cluster.

7. The method of claim 1, wherein the dimension set determining step further comprises using a variance along individual dimensions to determine the sets of projected dimensions.

8. The method of claim 7, wherein the dimension set determining step further comprises selecting sets of projected dimensions with the least variance.

9. The method of claim 1, further comprising the step of using the cluster structure for classification of data in the continuously progressing data stream.

10. The method of claim 9, wherein the cluster structure maintaining step further comprises maintaining the one or more clusters in a class-specific manner.

11. The method of claim 10, further comprising the step of identifying a class label of a closest cluster as the relevant label with respect to the data being classified.

12. Apparatus for processing a continuously progressing data stream, comprising:
a memory; and
at least one processor coupled to the memory, the at least one processor being operative to: (i) maintain a cluster structure, the cluster structure representing one or more clusters in the continuously progressing data stream, wherein the cluster structure comprises one or more data points in a multidimensional space, further wherein the one or more data points of the cluster structure fade as the continuously progressing data stream progresses; (ii) determine a set of projected dimensions for each of the one or more clusters using the one or more data points in the cluster structure, a given set of projected dimensions of a cluster being associated with a subset of a total number of dimensions of the continuously progressing data stream and the given set of projected dimensions being represented by a d-dimensional bit vector such that dimensions of the d dimensions in the bit vector that are present in the cluster are assigned one value and dimensions of the d dimensions in the bit vector that are not in the cluster are assigned another value, the given set of projected dimensions being continuously redefined to minimize a cluster radius, wherein redefining the set of projected dimensions comprises varying the values of the bit vector based on which dimensions are present and not present in the cluster as the data stream progresses and the one or more data points fade; and (iii) determine assignments for incoming data points of the continuously progressing data stream to the one or more clusters using distances associated with each set of projected dimensions for each of the one or more clusters.

13. The apparatus of claim 12, wherein the assignment determining operation further comprises assigning an incoming data point to a closest cluster of the one or more clusters when the incoming data point lies inside a boundary of the closest cluster.

14. The apparatus of claim 13, wherein the assigning operation further comprises determining the boundary of a cluster using a radius of the cluster.

15. The apparatus of claim 12, wherein the assignment determining operation further comprises assigning an incoming data point to a newly created cluster when the incoming data point lies outside a boundary of a closest cluster.

16. The apparatus of claim 12, wherein the assignment determining operation further comprises assigning the incoming data point to a closest cluster using the corresponding set of projected dimensions.

17. The apparatus of claim 12, wherein the assignment determining operation further comprises determining a distance of the incoming data point to each cluster using the corresponding set of dimensions for each cluster.

18. The apparatus of claim 12, wherein the dimension set determining operation further comprises using a variance along individual dimensions to determine the sets of projected dimensions.

19. The apparatus of claim 18, wherein the dimension set determining operation further comprises selecting sets of projected dimensions with the least variance.

20. The apparatus of claim 12, wherein the at least one processor is further operative to use the cluster structure for classification of data in the continuously progressing data stream.

21. The apparatus of claim 20, wherein the cluster structure maintaining operation further comprises maintaining the one or more clusters in a class-specific manner.

22. The apparatus of claim 21, wherein the at least one processor is further operative to identify a class label of a closest cluster as the relevant label with respect to the data being classified.

23. Apparatus, comprising:
a server, responsive to a continuously progressing data stream associated with one or more client devices, the server comprising: a memory and at least one processor coupled to the memory, the at least one processor being operative to: (i) maintain a cluster structure, the cluster structure representing one or more clusters in the continuously progressing data stream, wherein the cluster structure comprises one or more data points in a multidimensional space, further wherein the one or more data points of the cluster structure fade as the continuously progressing data stream progresses; (ii) determining a set of projected dimensions for each of the one or more clusters using the one or more data points in the cluster structure, a given set of projected dimensions of a cluster being associated with a subset of a total number of dimensions of the continuously progressing data stream and the given set of projected dimensions being represented by a d-dimensional bit vector such that dimensions of the d dimensions in the bit vector that are present in the cluster are assigned one value and dimensions of the d dimensions in the bit vector that are not in the cluster are assigned another value, the given set of projected dimensions being continuously redefined to minimize a cluster radius, wherein redefining the set of projected dimensions comprises varying the values of the bit vector based on which dimensions are present and not present in the cluster as the data stream progresses and the one or more data points fade; and (iii) determine assignments for incoming data points of the continuously progressing data stream to the one or more clusters using distances associated with each set of projected dimensions for each of the one or more clusters.

24. An article of manufacture for use in processing a continuously progressing data stream, the article comprising a computer readable storage medium containing one or more programs which when executed implement the steps of:
maintaining a cluster structure, the cluster structure representing one or more clusters in the continuously progressing data stream, wherein the cluster structure comprises one or more data points in a multidimensional space, further wherein the one or more data points of the cluster structure fade as the continuously progressing data stream progresses;
determining a set of projected dimensions for each of the one or more clusters using the one or more data points in the cluster structure, a given set of projected dimensions of a cluster being associated with a subset of a total number of dimensions of the continuously progressing data stream and the given set of projected dimensions being represented by a d-dimensional bit vector such that dimensions of the d dimensions in the bit vector that are present in the cluster are assigned one value and dimensions of the d dimensions in the bit vector that are not in the cluster are assigned another value, the given set of projected dimensions being continuously redefined to minimize a cluster radius, wherein redefining the set of projected dimensions comprises varying the values of the bit vector based on which dimensions are present and not present in the cluster as the data stream progresses and the one or more data points fade; and determining assignments for incoming data points of the continuously progressing data stream to the one or more clusters using distances associated with each set of projected dimensions for each of the one or more clusters.

* * * * *